United States Patent
Mabuchi (10) Patent No.: US 12,462,542 B2
(45) Date of Patent: Nov. 4, 2025

(54) INFORMATION PROCESSING METHOD

(71) Applicant: TOYOTA JIDOSHA KABUSHIKI KAISHA, Toyota (JP)

(72) Inventor: Mitsuhiro Mabuchi, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 18/228,832

(22) Filed: Aug. 1, 2023

(65) Prior Publication Data
US 2024/0071061 A1    Feb. 29, 2024

(30) Foreign Application Priority Data
Aug. 24, 2022    (JP) .................................. 2022-133601

(51) Int. Cl.
*G06V 10/80* (2022.01)
*G06V 10/26* (2022.01)
*G06V 10/82* (2022.01)

(52) U.S. Cl.
CPC .............. *G06V 10/80* (2022.01); *G06V 10/26* (2022.01); *G06V 10/82* (2022.01)

(58) Field of Classification Search
CPC ........ G06V 10/80; G06V 10/26; G06V 10/82; G06V 10/809
See application file for complete search history.

(56) References Cited

U.S. PATENT DOCUMENTS

| 2018/0165571 A1* | 6/2018 | Tanabe | ...................... G06N 3/04 |
| 2023/0052885 A1* | 2/2023 | Schlicht | ................ G06F 18/251 |
| 2024/0114254 A1* | 4/2024 | Tadano | ...................... G06T 7/11 |

FOREIGN PATENT DOCUMENTS

| JP | 2017-211259 A | 11/2017 |
| JP | 6784162 B2 | 11/2020 |
| WO | 2022/124067 A1 | 6/2022 |

OTHER PUBLICATIONS

Jakub Konecny et al., Federated Learning: Strategies for Improving Communication Efficiency, NIPS Workshop on Private Multi-Party Machine Learning (2016), URL:"https://arxiv.org/pdf/1610.05492.pdf.
Praneeth Vepakomma et al., Split Learning for Health: Distributed Deep Learning Without Sharing Raw Patient Data, Dec. 2018, URL:https://arxiv.org/pdf/1812.00564.pdf.

* cited by examiner

*Primary Examiner* — Jennifer Mehmood
*Assistant Examiner* — Dustin Bilodeau
(74) *Attorney, Agent, or Firm* — Dinsmore & Shohl LLP (57) ABSTRACT

An information processing method generates a learned model for image recognition, wherein a learning model includes a plurality of first models and a second model that is different from the first models. The information processing method includes: dividing an image that is to be used in learning into a plurality of patches; inputting each of the divided plurality of patches into a respective model of the plurality of first models, the respective model being predetermined for each of the patches, and performing calculation; and combining an output of a calculation result of each of the plurality of first models in the second model and generating a learned model by learning the learning model.

3 Claims, 6 Drawing Sheets

INFORMATION PROCESSING METHOD

CROSS-REFERENCE TO RELATED APPLICATION

This application is based on and claims priority under 35 USC 119 from Japanese Patent Application No. 2022-133601 filed on Aug. 24, 2022, the disclosure of which is incorporated by reference herein.

BACKGROUND

Technical Field

The present disclosure relates to an information processing method.

Related Art

Japanese Patent No. 6784162 discloses a technique in which a neural network is divided into plural sections and parameters are specified based on input/output characteristics.

In the related art, since neural networks are segmented in order to provide interim learning results to the respective neural networks, there is a technique in which although consideration can be given to privacy protection, original data is restored from data in the course of computation. For this reason, it is conceivable that there may be cases in which sufficient privacy protection cannot be achieved simply by segmenting a neural network, and there is room for improvement.

SUMMARY

An aspect of the present disclosure is an information processing method that generates a learned model for image recognition, wherein a learning model comprises a plurality of first models and a second model that is different from the first models, the method comprising, by a processor: dividing an image that is to be used in learning into a plurality of patches; inputting each of the divided plurality of patches into a respective model of the plurality of first models, the respective model being predetermined for each of the patches, and performing calculation; and combining an output of a calculation result of each of the plurality of first models in the second model and generating a learned model by learning the learning model.

DETAILED DESCRIPTION

An outline of an exemplary embodiment of the present disclosure is explained. Image recognition is being widely used due to deep learning, particularly because the accuracy of supervised learning, which requires correct answer data, has been improved. Applications that utilize models learned using sensitive information such as personal information, such as face recognition, emotion recognition, and the like, are also increasing. Laws relating to privacy protection, such as the General Data Protection Regulation (GDPR) and the California Consumer Privacy Act (CCPA), have been enacted in various countries, and privacy protection is also becoming important in data collection and model learning.

The problems described above regarding existing learning techniques exist as background to the present exemplary embodiment. Learning techniques relating to the problems include associative learning and segmented neural network techniques.

In one technique of associative learning, data is not collected by a central server, and only parameters of results learned at an edge (terminal at the data provider side) are collected, and the server learns the model using the collected parameters. However, in this technique, as the model becomes larger, the number of parameters increases, the amount of communication increases commensurately, and the amount of edge computation increases. Moreover, it is necessary to arrange the latest model to be learned at each edge.

In one approach to segmented neural networks, by segmenting a convolutional neural network (CNN) midway and holding and learning at different users' terminals, a user providing the data need not transmit the data itself, but need only transmit the interim learning results of the neural network to the terminal of a user that processes the learning. However, in order to increase the amount of data, it is necessary to increase the number of data providers (clients), which complicates communication during learning. Although privacy protection is possible because data is not collected, it is not possible to perform data adjustment, such as data checking in cases in which the accuracy is low, or provision of correct answer data, for example.

Each of these methods achieves privacy protection by not centrally collecting data. However, in cases in which the performance of the model is desired to be improved, there is the problem that data cannot be adjusted. Although measures such as applying masks to areas including privacy information, such as the face, are conceivable, there is a high likelihood of affecting cognitive performance.

When learning a neural network during deep learning of image recognition, large amounts of images are required, and in the case of supervised learning, labeling of correct answer data after collection is required. The acquired images contain privacy-related information, such as a face or a license plate for a vehicle, and even if security is ensured, in a case of storing in a single location, privacy information is included, and handling must be considered. Collection of privacy information requires consent of the relevant persons, and large amounts of information are difficult to collect.

In the present exemplary embodiment, an image used for learning is segmented into small-size patches and stored on an individual server. Moreover, based on the segmented neural network employing the above technique, as a configuration of a learning model tailored to segmented patches, a patch split neural network (NN) is used. An example of a configuration of the learning model will be described later.

By configuring small-size patches, the original image is segmented to a size from which privacy information cannot be identified even if it is included in the original image, and each single patch can be configured as non-privacy information. By storing the patches separately, the privacy information cannot be restored unless a predetermined number of patches configuring the original image are simultaneously extracted. However, some users may be given the authority to restore the original image, enabling the data to be analyzed.

The learning model divides the CNN into a two-part configuration having an upper model and a lower model. During learning, the upper model and the lower model are run on separate servers, and data (patches) used in learning are not gathered at a single location. Restoration from calculation results by outputting to the lower model via the calculation of the upper model, is not possible. Moreover, a number of upper models corresponding to the number of patches is prepared so as not to gather the patches on a single server. Note that in cases in which the number of upper models is less than the number of patches, the upper models are allocated as appropriate. An upper model is an example of a first model of the present disclosure, and a lower model is an example of a second model of the present disclosure.

According to the technique of the present exemplary embodiment, even in cases in which the learning is performed by patch segmentation, a learned model with sufficient recognition performance relative to cases in which the original image is used as-is, can be generated.

Figure 1:
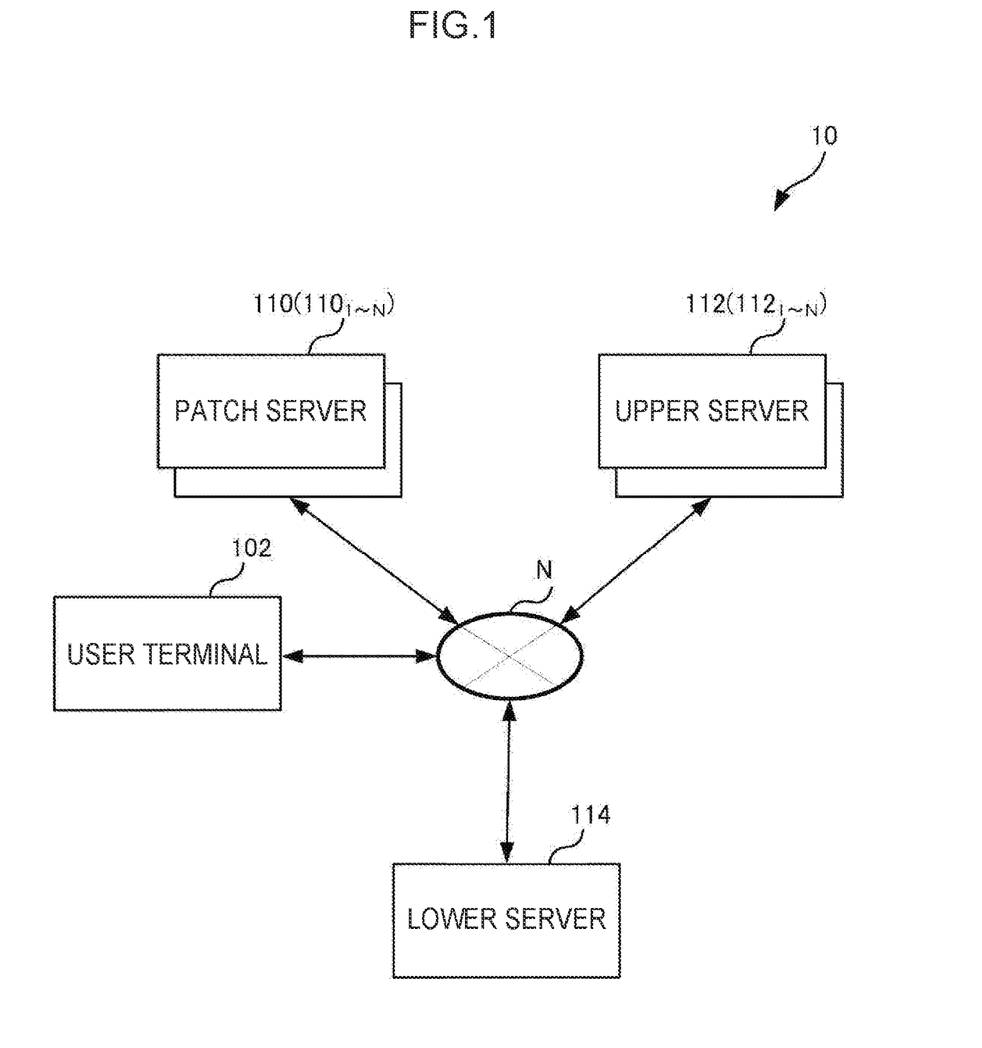
FIG. 1 is a diagram illustrating a configuration of an information processing system.

FIG. 1 is a diagram illustrating a configuration of an information processing system 10. As illustrated in FIG. 1, an information processing system 10 includes a user terminal 102, plural patch servers 110 ($110_{1-N}$) that hold patches, plural upper servers 112 ($112_{1-N}$) that hold respective models of plural upper models, and a lower server 114 that holds a lower model, all of which are connected together through a network N. The user terminal 102 is a terminal that inputs an image used for learning. The patch server 110 is a storage server that holds segmented patches. The upper server 112 and the lower server 114 are servers that hold a learning model and execute the learning model.

Figure 2:
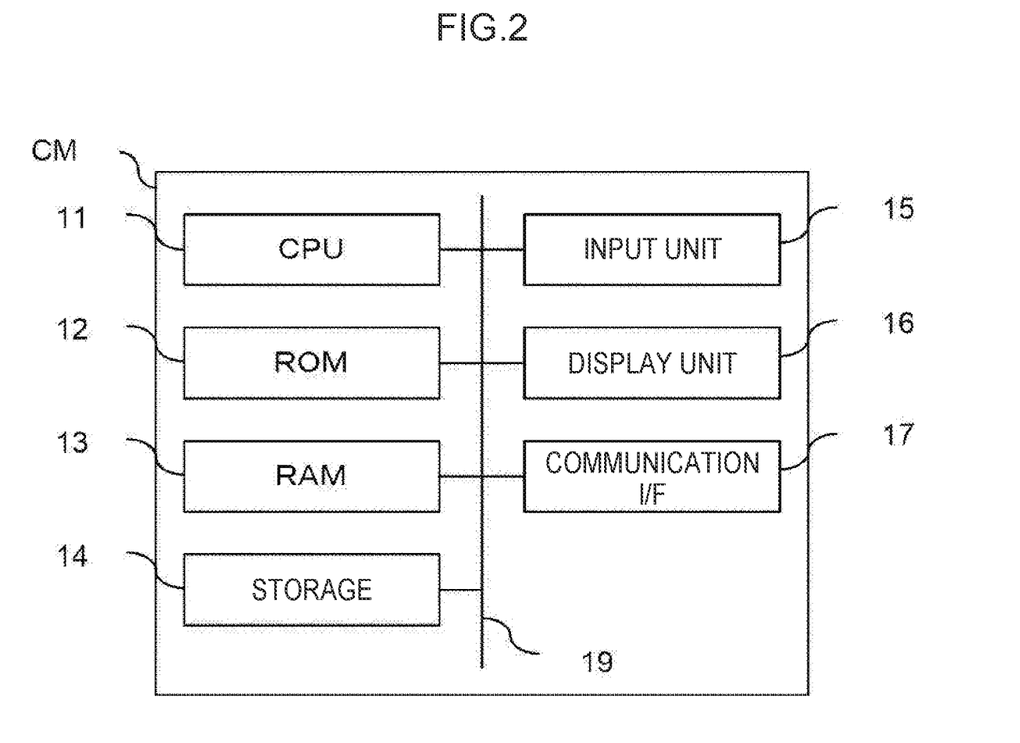
FIG. 2 is an example of a block diagram illustrating a hardware configuration serving as a computer of a user terminal and respective servers.

FIG. 2 is a block diagram illustrating hardware configuration serving as a computer (CM) of the user terminal 102 and the respective servers (110, 112, 114). As illustrated in FIG. 2, a computer (CM) includes a central processing unit (CPU) 11, read only memory (ROM) 12, random access memory (RAM) 13, storage 14, an input section 15, a display section 16, and a communication interface (I/F) 17. These configurations are connected together through a bus 19 so as to be capable of communicating with each other.

The CPU 11 executes various programs and controls various sections. Namely, the CPU 11, which is an example of a hardware processor, loads a program from the ROM 12 or the storage 14, which are equivalent to a memory, and executes the program using the RAM 13 as a workspace. The CPU 11 controls the respective configurations and performs various computation processing according to a program stored in the ROM 12 or the storage 14. In the present exemplary embodiment, an information processing program is stored in the ROM 12 or the storage 14. Since a general configuration may be used as a computer as the remaining hardware configuration, explanation thereof is omitted.

Figure 3:
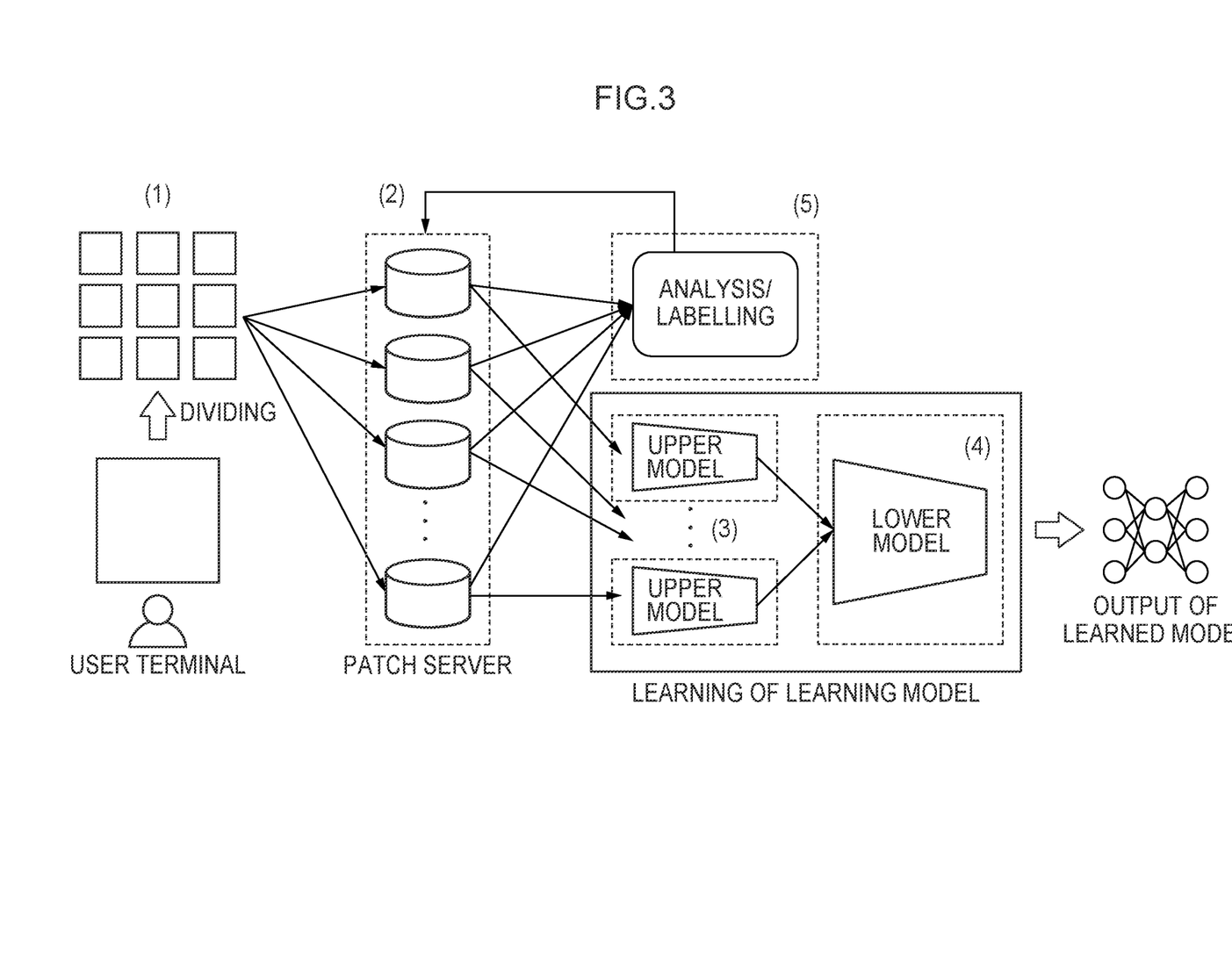
FIG. 3 is a diagram schematically illustrating an example of a configuration of a data flow and a learning model of an information processing system.

FIG. 3 is a diagram schematically illustrating an example of a data flow and a configuration of a learning model of the information processing system 10. Each patch is one of plural patches obtained by segmenting an image used in learning. The learning models learned by the information processing system 10 are divided into plural upper models and a lower model. Note that although the segmentation into patches is performed by the user terminal 102, the segmentation into patches may be performed by one patch server 110 followed by distribution to another patch server 110.

In (1) of FIG. 3, an image input by a user is divided into plural patches and uploaded to each of the patch servers 110. In (2), the patches are stored in separate patch servers 110. In (3), plural upper models are prepared, and patches are input to the respective upper models. Individual learning is performed using, among the learning models, the upper models. Note that the individual upper models are respectively activated and operated by independent upper servers 112. In (4), the output results of the respective upper models are transferred to the lower model, the output results of the respective upper models are integrated by, among the learning models, the lower model, to calculate loss, and the learning model is learned. The integrated loss calculation yields a recognition result for the learning model. In this manner, the information processing system 10 generates and outputs a learned model. (5) is given processing corresponding to the learning situation of the learning model. In (5), according to the learning situation of the learning model that has been learned, required patches are collected, images from the collected patches are restored and analyzed, and correct answer data is labeled appropriately on the patches.

Explanation follows regarding an example of a segmented pattern of a patch. Either (A) simple segmentation or (B) overlap may be used as the segmentation pattern. (A) Simple segmentation is performed based on, for example, the original size of an image. In (A) simple segmentation, in the case of an image of 32×32 size, the segmentation size is set to 16×16 size, and the image is segmented into four patches. The segmentation size may be set to 8×8, and the image segmented into 16 patches. (B) In the case of overlap, segmentation having overlapping of a fixed length is performed so as not to generate discontinuities. In an image of 32×32 size, if the segmentation size is 16×16 size and the slide number is 8, the image is segmented into 9 patches. Assuming a segmentation size of 8×8 and a slide number is of 4, the image is segmented into 49 patches. The segmentation pattern may be selectively used according to the complexity of the image.

Figure 4:
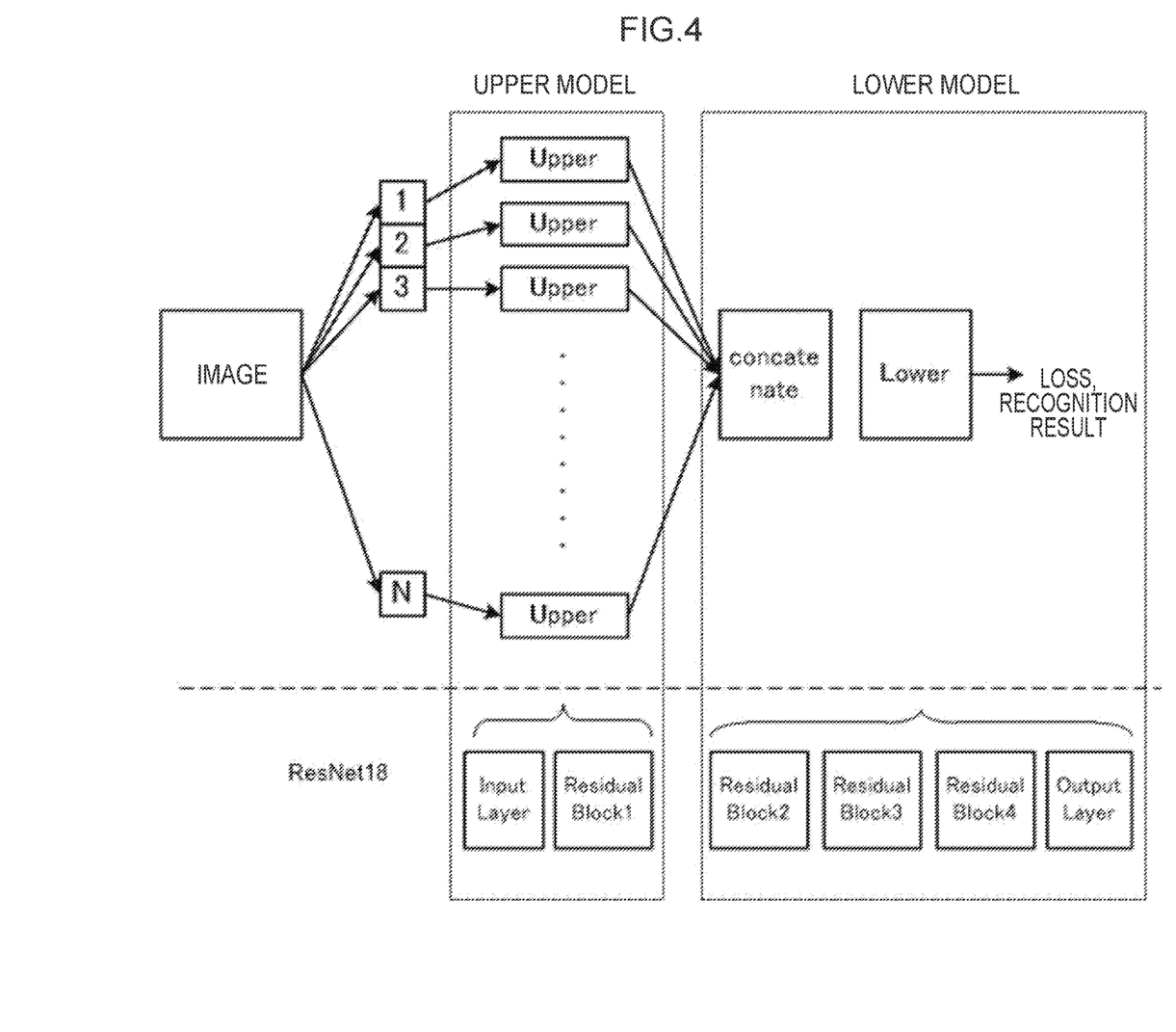
FIG. 4 is a diagram illustrating a configuration example of a neural network of a learning model.

FIG. 4 is a diagram illustrating an example of a configuration of a learning model serving as a neural network. The upper section shows a learning model serving as a patch split NN, and the lower section shows and compares ResNet 18, which is a type of CNN serving as a base. A case is assumed in which the upper model is configured similarly to the number of patches. The respective patches denoted by the numerals 1 to N are input to a corresponding upper model ("Upper" in the drawing). The lower model is provided with a concatenate layer that integrates outputs from the individual upper models, and then inputs the integrated outputs to the lower layer. Note that even if the number of upper models is not equivalent to the number of patches, it may be of a level that enables privacy information to be protected even in cases in which there is a patch model to which several patches are input. The upper model corresponds to the Input Layer and Residual Block 1 of the ResNet 18. The lower model corresponds to the Residual Blocks 2 to 4 and the Output Layer of the ResNet 18.

Flow of Control

Figure 5:
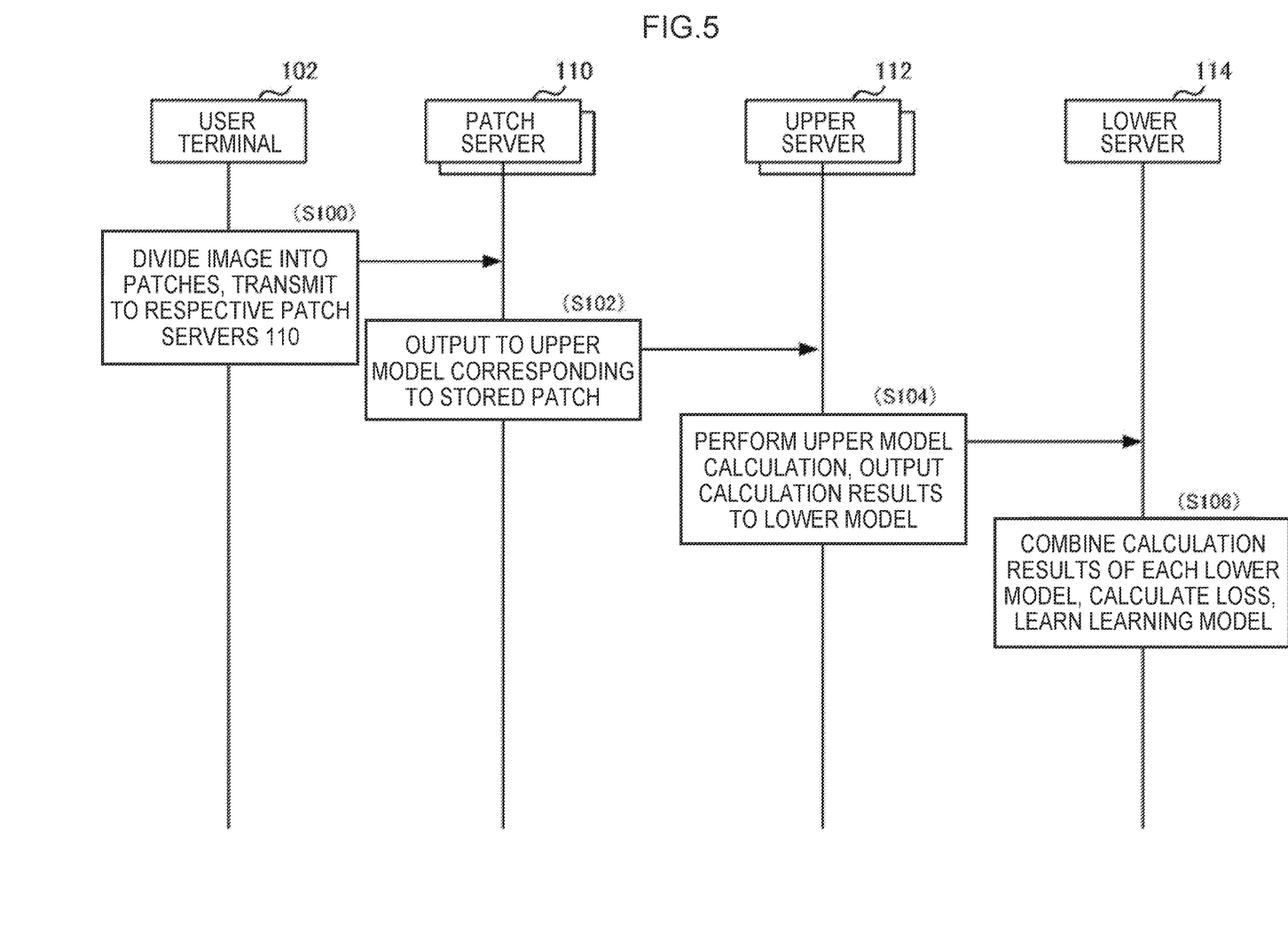
FIG. 5 is a sequence illustrating an example of a flow of processing serving as an information processing method executed by the information processing system of the present exemplary embodiment.

FIG. 5 is a sequence illustrating a flow of processing serving as an information processing method executed by the information processing system 10 of the present exemplary embodiment. In the information processing method, processing is executed by combining plural computers (the user terminal 102, the patch servers 110, each of the upper servers 112, and the lower server 114).

At step S100, the user terminal 102 divides the image into patches and transmits these to the respective patch servers 110.

At step S102, each of the patch servers 110 outputs an upper model (upper server 112 having an upper model) corresponding to the stored patch.

At step S104, each of the upper servers 112 performs calculation of the upper model, and outputs the calculation result to the lower model (the lower server 114 having the lower model).

At step S106, the lower server 114 integrates the computation results of each accepted lower model, calculates loss, and learns the learning model. As a learning technique, similarly to CNN learning, a technique of adjusting weight parameters of the upper model and the lower model from the calculated loss may be used.

As described above, the information processing system 10 of the present exemplary embodiment is configured to divide each patch and divide the learning model in accordance with the patch, enabling privacy protection during learning of the learning model to be achieved.

Modified Example

Figure 6:
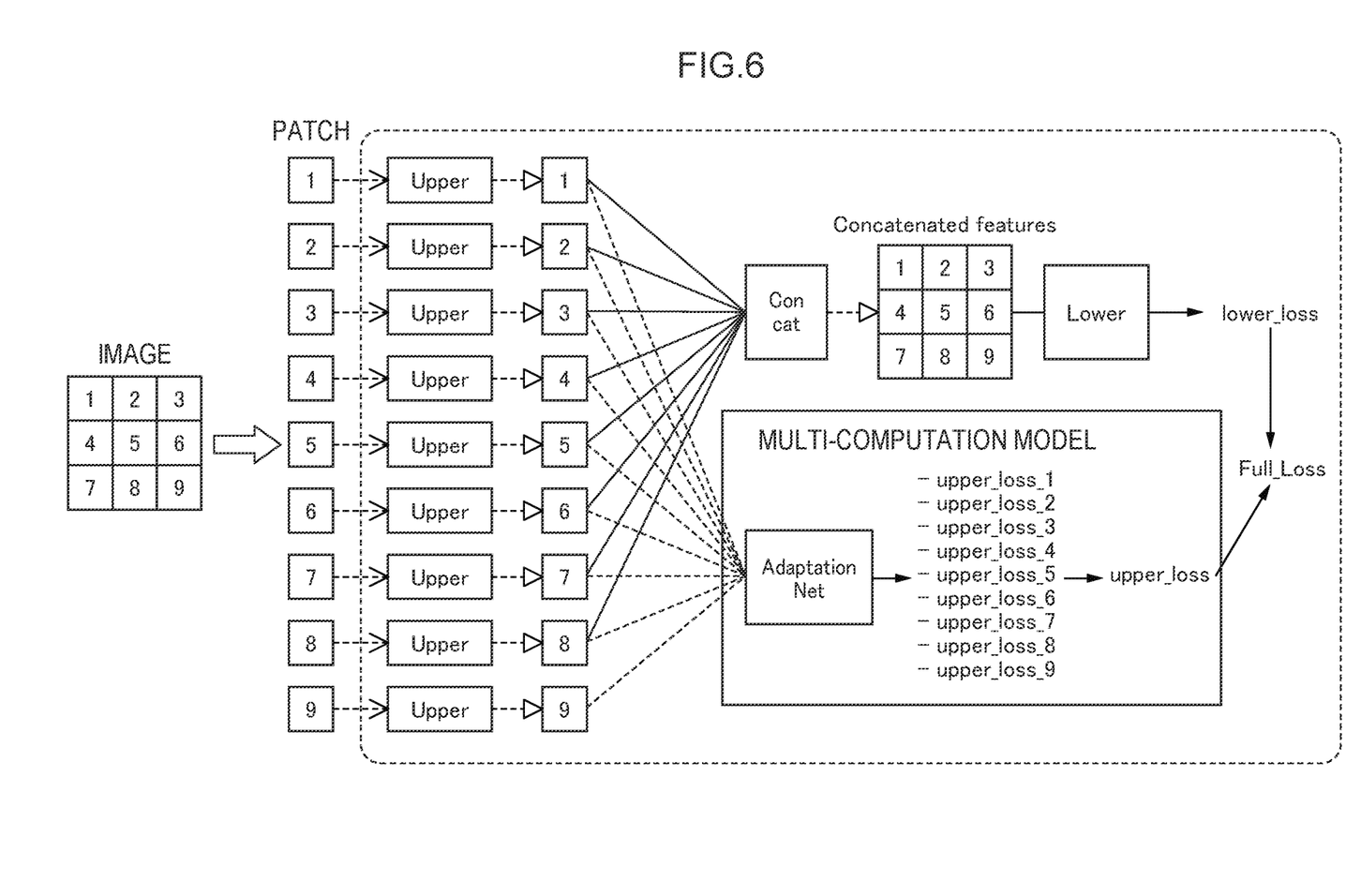
FIG. 6 is a configuration example in a case in which the exemplary embodiment is improved and a multi-computation model for calculating individual losses of an upper model is further provided. It is a diagram illustrating a configuration example of a neural network of a learning model.

FIG. 6 is a configuration example in a case in which the above exemplary embodiment is improved and a multi-computation model for calculating upper individual losses is further provided. Note that the multi-computation model may be provided in the lower server 114 or may be provided in an individual server. A multi-computation model is an example of a third model of the present disclosure.

In the multi-computation model, the computation results of the individual upper models are received, and individual loss (upper loss) is calculated for the individual computation results in an Adaptation Net. By introducing such a configuration during learning, learning of the upper model can be speeded up. Note that such a configuration is not required during inference.

The lower server 114 receives the calculation results of the individual losses calculated for the upper models, and performs overall loss calculation in accordance with the following equation (1). The learning of the learning model may be performed using the overall loss instead of the loss of the lower model.

$$\text{Full\_Loss} = \text{Lower\_Loss} + \alpha \left( \sum_{i=1}^{k} \text{Upper\_Loss}_i \right) \times \frac{\text{Num\_Of\_Upper\_Models}}{\text{Num\_Of\_Patches}} \quad \text{Equation (1)}$$

Full_Loss is the loss of the entire neural network, Lower_Loss is the loss calculated using the lower model, and Upper_Loss is the individual loss calculated for each upper model. Num_Of_Upper_Models is the number of upper models, Num_Of_Patches is the number of segmented patches, and $\alpha$ is the coefficient for the overall Upper_Loss.

Note that the individual layers in the Adaptation Net may be layers of AdaptiveAvgPool, Linner, BatchNorm, Linner, BatchNorm, ReLU, and Linner neural networks in this order from the input side. In a verification example employing the technique of the modified example, verification using CIFAR 10 and CIFAR 100 as the data set was performed, and it was confirmed that recognition accuracy equivalent to or greater than that in the case of learning using an original image as-is can be obtained.

Note that the various processing executed by the CPU 11 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). A graphics processing unit (GPU) or the like suitable for matrix computation processing, and thus neural network computation processing, may be used as a processor. The respective processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the information processing program is stored (installed) in advance in a non-transitory recording medium readable by a computer. For example, the information processing program is stored in advance in the ROM 12 or the storage 14. However, the respective programs are not limited thereto, and may be provided in a format recorded on a non-transitory recording medium such as compact disc read only memory (CD-ROM), digital versatile disc read only memory (DVD-ROM), or universal serial bus (USB) memory. Alternatively, the information processing program may be provided in a format downloadable from an external device over a network.

The flow of processing described in the above exemplary embodiments is an example, and unnecessary steps may be deleted, new steps may be added, or the processing order may be rearranged within a range not departing from the spirit of the present disclosure.

An object of the present disclosure is to provide an information processing method that enables privacy protection during learning of a learning model.

A first aspect of the present disclosure is an information processing method that generates a learned model for image recognition, wherein a learning model comprises a plurality of first models and a second model that is different from the first models, the method comprising, by a processor: dividing an image that is to be used in learning into a plurality of patches; inputting each of the divided plurality of patches into a respective model of the plurality of first models, the respective model being predetermined for each of the patches, and performing calculation; and combining an output of a calculation result of each of the plurality of first models in the second model and generating a learned model by learning the learning model.

An information processing method of a first aspect is configured by division into respective patches, and dividing the learning model in correlation with the patches. This enables privacy protection during learning of the learning model.

A second aspect of the present disclosure is the information processing method according to the first aspect, wherein, in the learning model, a number of the plurality of first models corresponding to the plurality of patches is configured to be equal to a number of the patches. According to an information processing method of a second aspect, learning data can be handled in a manner that enables privacy protection.

A third aspect of the present disclosure is the information processing method according to the first aspect, wherein each of the plurality of patches is stored individually and independently, and each of the plurality of first models operates individually and independently on a predetermined server. According to an information processing method of a third aspect, privacy protection is enabled because an original image cannot be restored from a single server.

A fourth aspect of the present disclosure is the information processing method according to the first aspect, wherein the second model receives and combines the output of the calculation results of the plurality of first models, calculates a loss of the second model, and learns the learning model. According to an information processing method of a fourth aspect, a model can be configured in a manner in which calculation of patches is individually and independently handled and privacy protection is enabled.

A fifth aspect of the present disclosure is the information processing method according to the fourth aspect, wherein: the learning model further comprises a third model, the third model receives the output of each of the plurality of first models and calculates an individual loss for each of the outputs, and an overall loss is calculated based on the individual losses and the loss of the second model and the learning model is learnt. According to an information processing method of a fifth aspect, learning of the learning model can be made faster by taking individual loss into consideration and feeding back the overall loss during learning.

According to the technique of the present disclosure, privacy protection during learning of a learning model is enabled.

What is claimed is:

1. An information processing method that generates a learned model for image recognition, wherein a learning model comprises a plurality of first models and a second model that is different from the first models, the method comprising, by a processor:
   dividing an image that is to be used in learning into a plurality of patches;
   inputting each of the divided plurality of patches into a respective model of the plurality of first models, the respective model being predetermined for each of the patches, and performing calculation; and
   combining an output of a calculation result of each of the plurality of first models in the second model and generating a learned model by learning the learning model,
   wherein the second model receives and combines the output of the calculation results of the plurality of first models, calculates a loss of the second model, and learns the learning model,
   wherein the learning model further comprises a third model,
   wherein the third model receives the output of each of the plurality of first models and calculates an individual loss for each of the outputs, and
   wherein an overall loss is calculated based on the individual losses and the loss of the second model and the learning model is learnt.

2. The information processing method according to claim 1, wherein, in the learning model, a number of the plurality of first models corresponding to the plurality of patches is configured to be equal to a number of the patches.

3. The information processing method according to claim 1, wherein each of the plurality of patches is stored individually and independently, and each of the plurality of first models operates individually and independently on a predetermined server.

* * * * *